United States Patent
Gagliardi et al.

[15] 3,701,153
[45] Oct. 24, 1972

[54] RADAR TESTING IN A CLUTTER ENVIRONMENT

[72] Inventors: Richard P. Gagliardi, China Lake, Calif.; Allen F. Beans, Ivyland; Alfred M. Eddowes, Doylestown; Herbert Greenblatt, Philadelphia, all of Pa.

[73] Assignee: The United States of America as represented by the Secretary of the Navy

[22] Filed: Feb. 4, 1971

[21] Appl. No.: 112,526

[52] U.S. Cl.................................343/17.7, 343/55 A
[51] Int. Cl................................................G01s 9/02
[58] Field of Search..................343/5 DP, 55 A, 17.7

[56] References Cited

UNITED STATES PATENTS 3,430,235   2/1969   Bender et al.............343/55 A
3,618,089   11/1971  Moran, Jr.................343/17.7

*Primary Examiner*—Malcolm F. Hubler
*Attorney*—R. S. Sciascia and Henry Hansen

[57] ABSTRACT

An analyzer receives an input signal from a candidate radar and distinguishes by means of timed pulses between a signal in clutter and an adjacent clutter signal. A histogram is formed of each of the signals which shows the amplitude of the received signals as a function of the frequency of the amplitude signals. The data of this histogram is then stored for further evaluation on the performance of the candidate radar.

9 Claims, 4 Drawing Figures

RADAR TESTING IN A CLUTTER ENVIRONMENT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The system generally relates to the testing of a candidate radar. More particularly, the system receives the electrical data from the output of the candidate radar for evaluation of the data.

Systems for testing radar generally provide a radar set with actual or simulated target information so that the radar set may be observed by qualified personnel for determining the performance of this set. The accuracy of such testing depends upon the qualifications of the personnel used, is subject to differences due to human error and is lacking in mathematical precision.

SUMMARY OF THE INVENTION

Accordingly, it is a purpose of the present invention to provide a meaningful data reduction of information from a candidate radar so that the ability of the candidate radar to distinguish target in a clutter environment may be evaluated.

This is accomplished by receiving video signals from the output of a candidate radar. The signals are multiplexed, sampled by a plurality of samplers at the same rate over the same period of time but at discrete finite points in time. Pulses formed by the samplers are arranged into histograms showing the frequency of occurrence of signal amplitudes. These histograms are then reduced to permanent type storage for further evaluation.

DESCRIPTION OF THE PREFERRED EMBODIMENT

Figure 1:
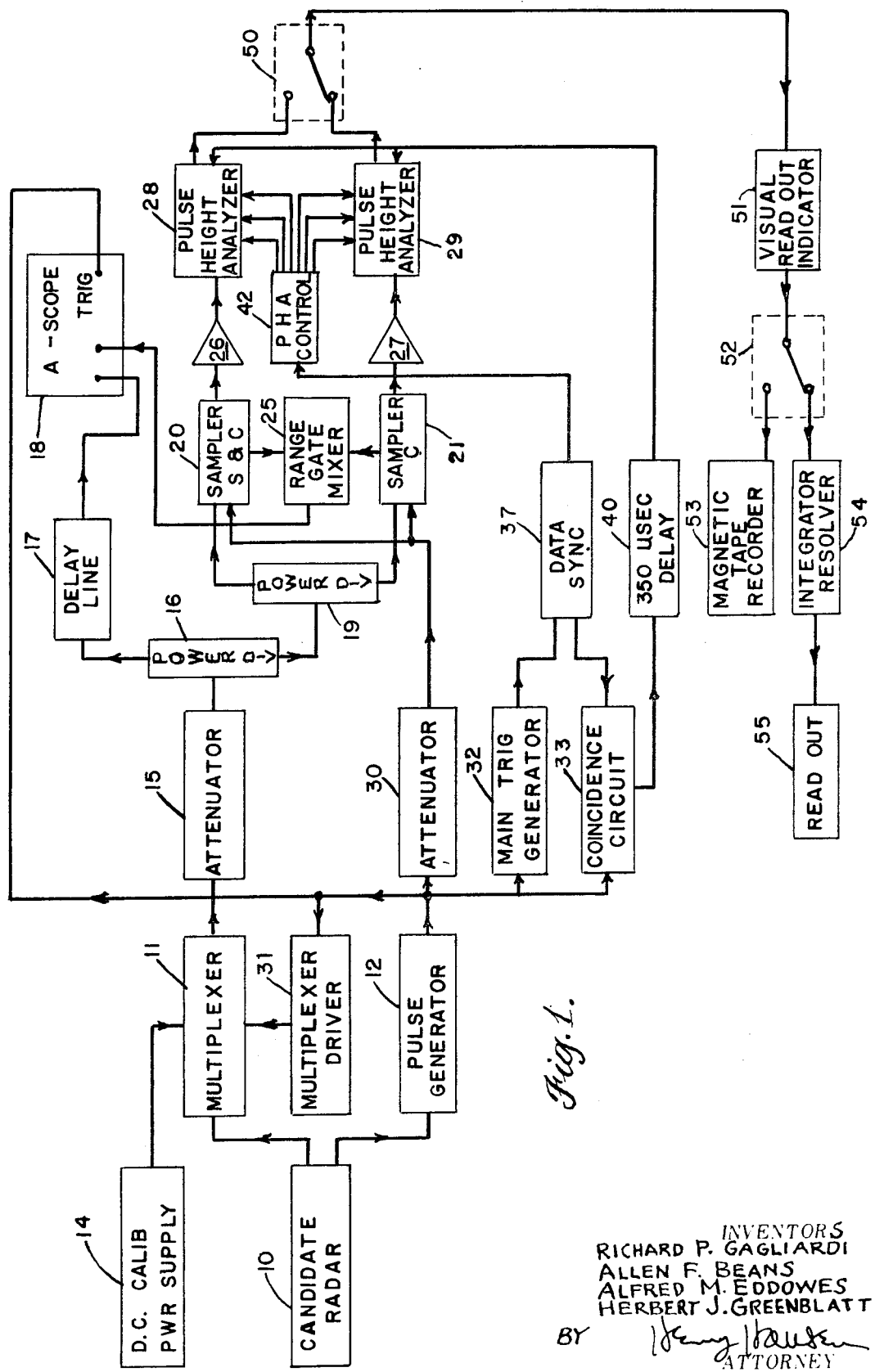
FIG. 1 is a block diagram of an embodiment of the present invention.

Referring now to FIG. 1 in which well known individual components are shown in block diagram form, there is shown a candidate radar 10 that supplies a video signal to multiplexer 11 and a trigger signal to pulse generator 12. The multiplexer 11 in addition to the signal from candidate radar set 10 receives a pulsing signal from a multiplexer driver 31 and a d.c. signal from d.c. calibrated power supply 14. The multiplexer 11 time shares the input signal from radar 10 and power supply 14 and applies an output signal to an attenuator 15 that, in turn, supplies an output to power divider 16. The power divider 16 divides the input signals to it equally and provides a first output to a delay line 17 whose output is applied to an input on a dual trace cathode ray tube oscilloscope 18 that provides a type-A presentation and is referred to as an A-scope. A second output from the power divider 16 is applied to an additional power divider 19 that equally divides the power and provides a first output to a sampler 20 and a second output to a sampler 21. Both samplers are identical with sampler 20 being synchronized to sample signal and clutter signals and sampler 21 is synchronized only to sample the clutter signals. The outputs of both sampler 20 and sampler 21 are applied to a range gate mixer 25 which has a single output to the A-scope 18. In addition, the outputs of samplers 20 and 21 are applied to respective operational amplifiers 26 and 27. The output of operational amplifier 26 is applied to pulse height analyzer 28. The output of operational amplifier 27 is applied to pulse height analyzer 29.

The pulse generator 12 provides output signals to the trigger input of the A-scope 18, attenuator 30, multiplexer driver 31, main trigger generator 32, and coincidence circuit 33. Attenuator 30 provides its output signal to both samplers 20 and 21. As previously mentioned the multiplexer driver 31 provides its output to broadband multiplexer 11. Main trigger generator 32 inverts the pulses received from multiplexer driver 31 and provides an output signal to a data synchronizing counter 37 that counts the number of samples to be recorded by pulse height analyzers 28 and 29. The data synchronizer 37 provides a batching pulse to pulse height analyzer control 42 that supplies accumulate, stop and display signals to pulse height analyzers 28 and 29. The pulse height analyzer control 42 on sensing the leading edge of the batching pulse provides an accumulate signal. On sensing the trailing edge of the pulse provides a Stop signal and a predetermined time of approximately 2 seconds after receipt of trailing edge of the batching pulse provides a Display signal. Typical differentiator circuits that fire monostable multivibrators may be used for sensing the leading and trailing edges and a time delay network can be added to a trailing edge sensor for providing the necessary time delay of approximately 2 seconds. Counter 37 additionally provides a signal to coincidence circuit 33. The output of coincidence circuit 33 is applied to a 350 microsecond delay 40. The output of delay 40 is applied to pulse height analyzers 28 and 29. The pulse height analyzers 28 and 29 provide output signals to a function switch 50. The function switch 50 is manually operated to select the output of either analyzer 28 or 29. The output of function switch 50 is applied to a commercially available visual readout indicator 51 capable of providing visual indication on any of the analyzers channels. The indicator 51 supplies the entire signal from the analyzers to an output switch 52. The output of switch 52 can be applied to either a magnetic tape recorder 53 or an integrator resolver 54. The output of integrator resolver 54 is applied to a readout device 55. This readout device could be in the form of a typewriter or a type-punch readout or any other standard device.

The operation of the device will now be described with reference to the figures. The candidate radar 10 may be a pulse radar, emitting short bursts of energy such as the APS–116. The return video signal from this candidate radar 10 is applied to a multiplexer 11. In addition a d.c. calibrated signal is received by multiplexer 11 from power supply 14. A radar trigger signal is supplied from the candidate radar 10 to a pulse generator 12 that provides an interface for the incoming signal and provides an output pulse for use as a trigger source in initiating all triggering for the remaining instrumentation. A signal from the pulse generator 12 is applied to multiplexer 11 through multiplexer driver 31. The multiplexer driver 31 counts the received pulses and provides trigger pulses to the multiplexer 11 at predetermined intervals.

Figure 2:
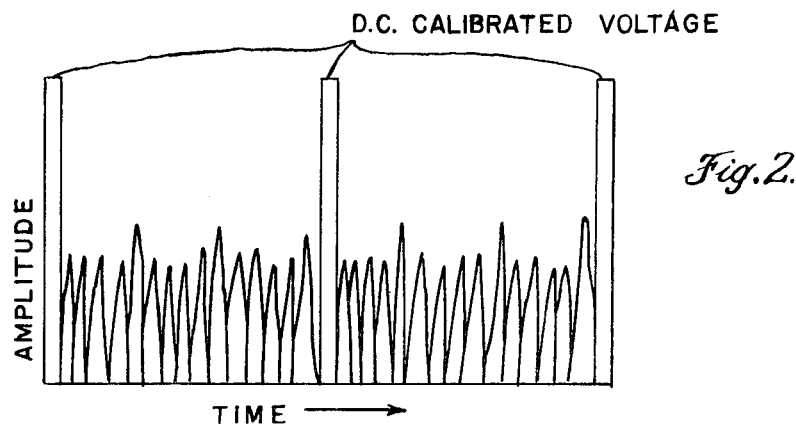
FIG. 2 illustrates a multiplexed signal within the embodiment of FIG. 1.

The multiplexer 11 is used for time sharing the video input from radar 10 with the d.c. voltage from power supply 44. The d.c. input provides a check on the d.c. amplifiers in the sample and hold circuitry and allows a check on adjustment of the loop gain of the samplers 20 and 21. The multiplexer 11 is a mechanical mercury wetted single pole double throw switch and is triggered by a typical countdown circuit within the multiplexer driver 31 that receives its input signal from pulse generator 12. The multiplexer driver 31 may comprise a monostable multivibrator that on receiving an input pulse remains on for a predetermined period of time and the trailing edge of its pulse activates a second multivibrator for a second predetermined period of time. The multiplexer 11 is normally set so that approximately 1 percent of the time is devoted to passing the d.c. calibrated input. The d.c. calibrated input is larger than the video input and is clearly distinguishable by the pulse height analyzers 28 and 29. A typical distribution curve of the signals passing through the broadband multiplexer 11 is shown in FIG. 2. In order to provide clarity the d.c. calibrated voltage is not drawn to scale as to 1 percent.

The output of multiplexer 11 is applied to an attenuator 15 which supplies its output signal to the power divider 16. One output from power divider 16 is supplied to a delay line 17 for supplying a delayed signal to the A-scope 18. Since the samplers 20 and 21 have a built in delay of approximately 47 $\mu$sec., delay line 17 was inserted to compensate for this delay for viewing purposes only. The A-scope 18 is suitable for viewing a multitude of signals simultaneously, one of which is that received from delay line 17. The function of the delay line 17 is to insert a delay in the signal applied to it as this signal is to be aligned in time with other signals on the A-scope 18 that have built in delays that could not be averted. This will be more fully explained later after a description of the other signals applied to the A-scope 18. The signal from multiplexer 11 through attenuator 15, power divider 16 and delay line 17 applied to the A-scope 18 is shown as the bottom trace of FIG. 3. Due to the pulsing rate of 2 kc. prf at the trigger input the d.c. calibrated voltage is separated from the radar video.

A second output from power divider 16 is applied to power divider 19 whose two outputs are applied to samplers 20 and 21, respectively. These samplers 20 and 21 in addition receive a trigger signal from pulse generator 12 through attenuator 30. The samplers 20 and 21 provide the function of sampling the applied signal at the same rate as the candidate radar 10 transmits pulses. The samplers 20 and 21, however, do not sample the same signal as sampler 20 is locked in on the strongest signal for determination if a target is present and sampler 21 locks in on clutter which is known not to present a target.

Figure 3:
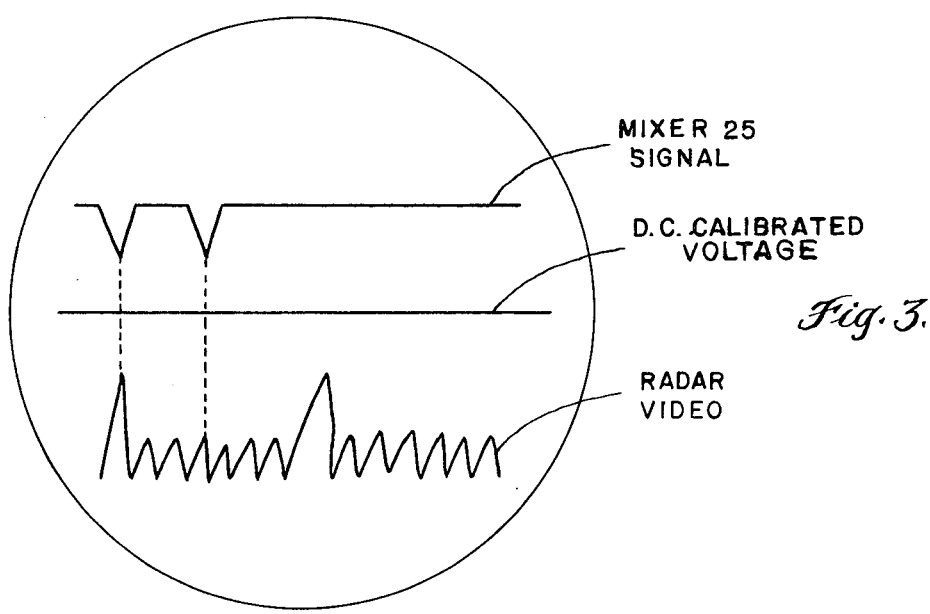
FIG. 3 illustrates a comparison of signals at selected points in FIG. 1.

The samplers 20 and 21 are well known in the art and the receipt of a trigger signal from pulse generator 12 through attenuator 30 samples a small portion of the video signal of approximately 350 picoseconds. The sampler further supplies a range gate pulse during the sampling time to the range gate mixer 25. The range gate mixer 25 applies both signals from samplers 20 and 21 to the A-scope 18 so that the signals from the samplers 20 and 21 may be compared in time with the signal on the A-scope 18 that was received from delay line 17. The delays built within samplers 20 and 21 and the associated length of lines must necessarily coincide with the delay provided by delay line 17 so that all signals coincide in time at A-scope 18. If there is no coincidence in time as viewed on A-scope 18 then the samplers may be adjusted to sample the portion of the signal required. The comparison of signals is shown in FIG. 3 with the first pulse coinciding in time with a target signal on the radar video trace and the second pulse coinciding with a clutter signal. In addition, samplers 20 and 21 boxcar the received pulse signals and supply the boxcarred signals to operational amplifiers 26 and 27, respectively, which, in turn, provide their output signals to respective pulse height analyzers 28 and 29.

The function of the pulse height analyzers 28 and 29 is to provide a histogram of a fixed number of pulses with the abscissa showing the respective magnitude of the pulses received and the ordinate showing the frequency with which each amplitude is received.

The starting and stopping of the accumulation of data by the pulse height analyzers 28 and 29 is controlled by data synchronizer counter 37. Data synchronizer 37 receives a pulsing signal from pulse generator 12 through main trigger generator 32. The counter 37 with a preset head is set to the determined number of samples. By operating a reset button on the counter the counter counts the number of pulse repetition frequencies as set on the preset head. The data synchronizer 37 supplies a batching pulse to the pulse height analyzer control 42 that supplies signals for the accumulating stopping and display modes of the pulse height analyzers 28 and 29. In addition, the counter 37 supplies a signal to coincidence circuit 33 which also receives a signal from pulse generator 12. As the name of the circuit indicates when both signals are present a pulse is supplied to a 350 microsecond delay 40 which in turn supplies a signal to pulse height analyzers 28 and 29 to accept the signals from operational amplifiers 26 and 27. This delay is necessary to insure that sampling occurs when the boxcar outputs reach their full amplitude.

Figure 4:
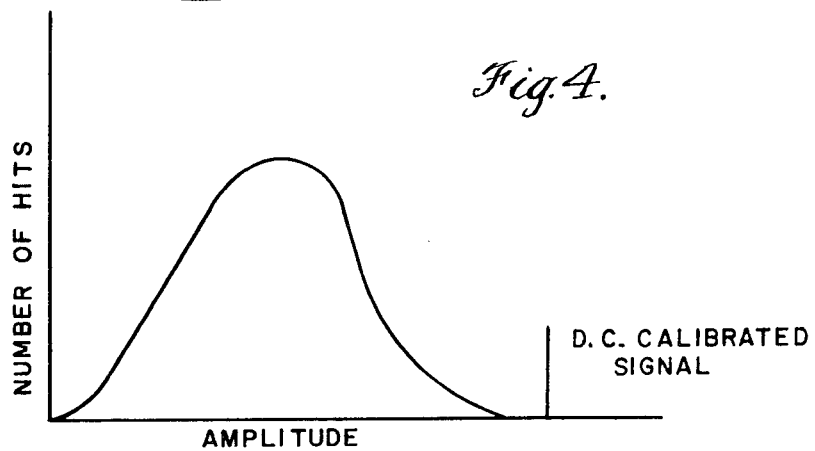
FIG. 4 represents the distribution of amplitudes of portions of the multiplexed signal of FIG. 2.

The pulse height analyzers 28 and 29 are each divided Into 400 signal amplitude bins (also referred to as "channels"). The pulse height analyzers record the received signals in the appropriate bin depending upon its amplitude. The reading of the pulses is initiated from a signal from the pulse height analyzer control 42. The termination of reading of the signals is again controlled from the pulse height analyzer control 42 to initiate a display on a CRT in pulse height analyzers 28 or 29 in the form of a histogram as shown in FIG. 4. This histogram has for the abscissa the amplitude of the received signals and the ordinate is the number of pulses received in each amplitude bin over a predetermined number of pulses.

The function switch 50 is a single pole double throw switch that enables the selection of either of the pulse height analyzers 28 or 29 output. The visual readout indicator 51 contains three columns of four lights each for address information. The visual readout indicator 51 enables an operator to determine count and channel data visually on individual channels.

The switch 52 takes the output of the visual readout indicator 51 and switches it to either the integrator resolver 54 or a magnetic tape recorder 53 for recording the information received. The integrator resolver 54 may be operated in either of two modes, normal or subtotal. In the normal mode each channel of the 0 to 398 channels are counted and recorded and the total is then stored in channel 399. If an additional run is made the information in channel 399 is lost. However, the new count will be added to the count in channels 0 to 398. This is a method of adding the totals of one histogram to that of another. In the subtotal mode each channel count is added to the previous channel count and a running total is available. In other words, each channel will indicate the number of pulses of a lower magnitude than that particular channel. These subtotals will be recorded in the band of channels selected for integration replacing the information previously stored in the channels. The integrated result is recorded and can be displayed or printed on a readout device 55. The use of this information for determination of the presence of a target is well known to those in the art.

It has therefore been shown a device in which the output signal of a radar device can be analyzed and compared to what is known to physically exist. It would be obvious to supply a plurality of the devices such as visual readout indicators, magnetic tape recorders, integrator resolvers and readout devices so that all pulse height analyzers could supply their information and be analyzed simultaneously.

It will be understood that various changes in the details, materials, steps and arrangements of part, which have been herein described and illustrated in order to explain the nature of the invention, may be made by those skilled in the art within the principle and scope of the invention as expressed in the appended claims.

What is claimed is:

1. A radar signal processing system comprising:
    multiplexing means adapted to receive radar video signals and a d.c. calibrated signal for providing a multiplexed output signal of the video and d.c. signals;
    first sampling means operatively connected to receive the multiplexed output signal and trigger timing signals for taking a first sample of the multiplexed output signal at first predetermined intervals and boxcarring the first sample signals;
    second sampling means operatively connected to receive the multiplexed output signal and to receive trigger timing signals for taking a second sample of the multiplexed output signal at second predetermined intervals at the same rate but at differing time increments than the first predetermined intervals and boxcarring the second sample signals; and
    analyzing means operatively connected to said first and second sampling means for receiving the first and second boxcarred signals for providing information on the number of boxcarred signals within predetermined amplitude bins for a predetermined fixed number of samples.

2. A radar signal processing system according to claim 1 wherein said analyzing means further comprises:
    first pulse height analyzing means operatively connected to said first sampling means for receiving the first boxcarred signals and providing information on the number of boxcarred signals within predetermined amplitude bins for a predetermined fixed number of samples;
    second pulse height analyzing means operatively connected to said second sampling means for receiving the second boxcarred signals and providing information on the number of boxcarred signals within predetermined amplitude bins for a predetermined fixed number of samples; and
    counter means operatively connected to receive the trigger timing signals and for providing output signals determinative of the number of predetermined fixed number of samples operated upon by said first pulse height analyzing means and said second pulse height analyzing means.

3. A radar signal processing system according to claim 2 further comprising:
    a visual readout indicator selectively connected to one of said first pulse height analyzing means and said second pulse height analyzing means for providing visual indication of the number of boxcarred signals received by said selected pulse height analyzer within a preselected amplitude bin.

4. A radar signal processing system according to claim 3 further comprising:
    integrator resolving means operatively connected to a selected one of said first pulse height analyzing means and said second pulse height analyzing means for providing information on the number of boxcarred signals received by the selected pulse height analyzing means of a magnitude less than a preselected amplitude.

5. A radar signal processing system according to claim 4 further comprising:
    recording means operatively connected to a selected one of said first pulse height analyzer and said second pulse height analyzer for providing a permanent record of the number of boxcarred signals within predetermined amplitude bins in the selected pulse height analyzer.

6. A radar signal processing system according to claim 5 further comprising:
    viewing means operatively connected to receive the video signal from said multiplexer and signals from said first and second sampling means determinative of the time of said first predetermined interval and said second predetermined interval for providing a visual output showing the portion of said video signal sampled.

7. A radar signal processing system according to claim 6 further comprising:
    mixing means interposed between said first and second sampling means and said viewing means for mixing the signals from said first and second sampling means and providing a single output to said viewing means.

8. A radar signal processing system according to claim 7 wherein said viewing means further comprises:
a cathode ray tube oscilloscope with a dual trace vertical amplifier unit.

9. A radar signal processing system according to claim 8 further comprising:
delay means interposed between said multiplexer means and said viewing means.

* * * * *